US007305357B2

(12) United States Patent
Hamilton

(10) Patent No.: US 7,305,357 B2
(45) Date of Patent: Dec. 4, 2007

(54) METHOD AND SYSTEM FOR PROVIDING AND CONTROLLING DELIVERY OF CONTENT ON-DEMAND OVER A CABLE TELEVISION NETWORK AND A DATA NETWORK

(75) Inventor: Robert Douglas Hamilton, Calgary (CA)

(73) Assignee: Shaw Cablesystems, G.P., Calgary (CA)

( * ) Notice: Subject to any disclaimer, the term of this patent is extended or adjusted under 35 U.S.C. 154(b) by 233 days.

(21) Appl. No.: 10/055,255

(22) Filed: Jan. 24, 2002

(65) Prior Publication Data

US 2003/0139980 A1 Jul. 24, 2003

(51) Int. Cl.
G07F 17/60 (2006.01)
(52) U.S. Cl. .................. 705/27; 705/1; 709/217; 725/109; 725/114; 725/127
(58) Field of Classification Search .............. 705/27, 705/26, 1; 707/10; 709/217; 725/109, 114, 725/127
See application file for complete search history.

(56) References Cited

U.S. PATENT DOCUMENTS

| 3,987,397 | A | * | 10/1976 | Belcher et al. ................ 725/14 |
| 4,008,369 | A | * | 2/1977 | Theurer et al. ................ 725/3 |
| 4,117,492 | A | * | 9/1978 | Arnold et al. ............... 343/747 |
| 4,393,277 | A | * | 7/1983 | Besen et al. ............. 379/88.24 |
| 4,509,210 | A | * | 4/1985 | Kohn ......................... 455/349 |
| 4,841,368 | A | * | 6/1989 | Rumbolt et al. ............ 348/734 |
| 4,856,081 | A | * | 8/1989 | Smith ...................... 455/151.4 |
| 5,101,499 | A | * | 3/1992 | Streck et al. .................. 725/81 |
| 5,374,952 | A | * | 12/1994 | Flohr ....................... 348/14.08 |
| 5,475,585 | A | * | 12/1995 | Bush .......................... 364/401 |
| 5,534,913 | A | * | 7/1996 | Majeti et al. ................ 725/114 |
| 5,583,561 | A |   | 12/1996 | Baker et al. .................... 348/7 |
| 5,655,214 | A | * | 8/1997 | Mullett ........................ 725/78 |
| 5,708,961 | A | * | 1/1998 | Hylton et al. ................. 725/81 |
| 5,715,315 | A | * | 2/1998 | Handelman ................. 380/234 |
| 5,720,037 | A | * | 2/1998 | Biliris et al. .................. 725/92 |

(Continued)

FOREIGN PATENT DOCUMENTS

JP 1041767 * 10/2000

OTHER PUBLICATIONS

White, Ron, How Computers Work, Millennium Ed. Que Corporation, Sep. 1999.*

(Continued)

*Primary Examiner*—Andrew J. Fischer
*Assistant Examiner*—John Winter
(74) *Attorney, Agent, or Firm*—Gordon & Jacobson, PC

(57) ABSTRACT

A system and method for delivering content on-demand by way of a cable network are disclosed. Provision of such content is controlled over a data network. Advantageously, a user interface at a conventional computing device may be used to order content and to control its delivery and playing. Commands from the computing device may be provided by way of data network to a network interconnected server. The server under software control causes a media receiver at the customer premises to be properly tuned to receive content on-demand, and content on-demand to be played, as requested by the computing device. The media receiver may include a conventional set-top box that may be tuned remotely in response to a customer placing an on-demand order.

18 Claims, 14 Drawing Sheets

U.S. PATENT DOCUMENTS

| | | | | |
|---|---|---|---|---|
| 5,732,078 | A * | 3/1998 | Arango | 370/355 |
| 5,784,597 | A * | 7/1998 | Chiu et al. | 713/401 |
| 5,831,662 | A * | 11/1998 | Payton | 725/122 |
| 5,850,340 | A * | 12/1998 | York | 700/83 |
| 5,903,816 | A * | 5/1999 | Broadwin et al. | 725/110 |
| 5,929,849 | A * | 7/1999 | Kikinis | 725/113 |
| 5,956,716 | A | 9/1999 | Kenner et al. | 707/10 |
| 5,961,603 | A * | 10/1999 | Kunkel et al. | 709/229 |
| 6,023,622 | A * | 2/2000 | Plaschke et al. | 455/452.2 |
| 6,025,837 | A * | 2/2000 | Matthews et al. | 345/721 |
| 6,049,831 | A * | 4/2000 | Gardell et al. | 709/236 |
| 6,078,961 | A | 6/2000 | Mourad et al. | 709/235 |
| 6,084,638 | A * | 7/2000 | Hare et al. | 348/552 |
| 6,134,531 | A * | 10/2000 | Trewitt et al. | 705/10 |
| 6,141,682 | A * | 10/2000 | Barker | 709/217 |
| 6,148,142 | A * | 11/2000 | Anderson | 386/125 |
| 6,175,861 | B1 * | 1/2001 | Williams et al. | 709/217 |
| 6,195,797 | B1 * | 2/2001 | Williams, Jr. | 725/74 |
| 6,202,211 | B1 * | 3/2001 | Williams, Jr. | 725/78 |
| 6,205,485 | B1 * | 3/2001 | Kikinis | 709/231 |
| 6,275,268 | B1 * | 8/2001 | Ellis et al. | 348/564 |
| 6,275,497 | B1 * | 8/2001 | Varma et al. | 370/431 |
| 6,279,158 | B1 * | 8/2001 | Geile et al. | 725/126 |
| 6,282,714 | B1 * | 8/2001 | Ghori et al. | 725/81 |
| 6,285,407 | B1 * | 9/2001 | Yasuki et al. | 348/554 |
| 6,313,880 | B1 * | 11/2001 | Smyers et al. | 348/552 |
| 6,317,884 | B1 * | 11/2001 | Eames et al. | 709/217 |
| 6,324,694 | B1 * | 11/2001 | Watts et al. | 725/32 |
| 6,377,861 | B1 * | 4/2002 | York | 700/83 |
| 6,425,131 | B2 * | 7/2002 | Crandall et al. | 725/106 |
| 6,453,473 | B1 * | 9/2002 | Watson, Jr. | 725/120 |
| 6,477,508 | B1 * | 11/2002 | Lazar et al. | 705/26 |
| 6,571,296 | B1 * | 5/2003 | Dillon | 709/250 |
| 6,636,273 | B1 * | 10/2003 | Weber | 348/734 |
| 6,671,741 | B1 * | 12/2003 | Dillon | 709/250 |
| 6,839,770 | B1 * | 1/2005 | Dillon | 709/245 |
| 6,848,116 | B1 * | 1/2005 | Land | 725/78 |
| 2002/0046406 | A1 * | 4/2002 | Chelehmal et al. | 725/87 |
| 2002/0152311 | A1 * | 10/2002 | Veltman et al. | 709/227 |
| 2003/0007103 | A1 * | 1/2003 | Roy | 348/731 |

OTHER PUBLICATIONS

Derfler, Frank J. et. al. How Networks Work, Millennium Ed., Que Corporation, Jan. 2000.*

Gralla, Preston, How the Internet Works, Millenium Ed., Que Corporation, Aug. 1999.*

Horngren, Charles T., and Sundem, Gary L., Introduction to Financial Accounting, Revised 3rd Ed., Prentice-Hall, Inc., 1988.*

White, Ron, How Computers Work, 6th Ed., Que Corporation, Sep. 10, 2001.*

Gralla, Preston, How the Internet Works, 6th Ed., Que Corporation, Sep. 7, 2001.*

Muller, Nathan J., Desktop Encyclopedia of the Internet, Artech House, Inc., 1998.*

Pay Per View Streaming using Vitalstream and Paypal (Date, Author unknown).*

* cited by examiner

METHOD AND SYSTEM FOR PROVIDING AND CONTROLLING DELIVERY OF CONTENT ON-DEMAND OVER A CABLE TELEVISION NETWORK AND A DATA NETWORK

FIELD OF THE INVENTION

The present invention relates to the provision of content on-demand, and more particularly to the provision of content on-demand by way of a cable television network.

BACKGROUND OF THE INVENTION

The desire to provide home television viewers and listeners with the ability to view video and listen to audio on-demand has existed for some time. In recent years, the introduction of high capacity data networks and improved video and audio compression techniques has made the availability of audio and video content on-demand possible.

For example, high capacity packet or circuit switched networks may be used to carry digital video or audio streams for delivery to suitable viewer or listener appliances. The public internet, private packet switched networks, ATM networks, and broadband ISDN networks have all been suggested as appropriate delivery networks for content on-demand. Complementary viewer or listener equipment located at the customer premises may be addressed over such networks to receive and present the content. Example equipment includes internet appliances, intelligent set-top television boxes, or personal computers with appropriate software. Characteristically, these appliance may typically be uniquely addressed over the delivery network; decode and present the video or audio stream; and permit two-way communication over the delivery network to place on-demand orders and control the playing of the content on-demand.

Existing cable television network operators are also well positioned to provide content on-demand over existing networks. As such, cable television networks have been gradually updated, and continue to be updated, to allow provision of digital content, pay-per-view programming, two-way data access, and ultimately content on-demand. Existing cable subscribers expect these services to be delivered by the cable network operators over the medium with which they are familiar. Moreover, cable network operators have access to content, and experience in providing pay-per-view content.

Cable network operators are also uniquely affected by the constant need to upgrade customer premises equipment. Many subscribers have only recently upgraded set-top-boxes to obtain digital content and enhanced pay-per-view offerings. New features and improvements in user interfaces drive an incessant desire to upgrade these boxes.

Providing content on-demand typically requires additional upgrades. Unlike other customer premises equipment, cable network set-top boxes are typically owned by the cable network and not by subscribers. Upgrading these is therefore costly to the network operator, and even more costly if customer premises equipment for all subscribers is upgraded. Subscribers, on the other hand, often find the need to constantly upgrade as intrusive and bothersome. Allowing subscribers to upgrade equipment only as content on-demand is requested, on the other hand, is more cost efficient but prevents the content from being provided to many subscribers—subscribers who do not have the necessary upgrade simply do not have access to the content. Even subscribers who want the new content may not believe it warrants the effort of an upgrade.

Some existing cable set-top boxes address this dilemma by permitting software upgrades that may be initiated by the network operator, and provided to subscribers transparently over the existing cable network. These upgrades allow set-top boxes to support new features and services. Unfortunately, existing hardware often limits the type of scope of the upgrades. The amount of memory, processor speed, and chipset functionality at existing set-top boxes, for example, limit the types of upgrades that are possible. Provision of content on-demand, for example, often requires sophisticated interface software, or hardware upgrades providing, for example, additional remote control functions, two-way data access and the ability to present and navigate extensive lists of available content.

Accordingly, there is a clearly a need to allow existing cable television subscriber and other customers access to content on-demand, while reducing the need to upgrade existing customer premises equipment.

SUMMARY OF THE INVENTION

In accordance with an aspect of the present invention, content on-demand is delivered by way of cable network. Provision of such content is controlled by over data network. Advantageously, a user interface at a conventional computing device may be used order content and to control its delivery and playing.

Commands from the computing device may be provided by way of data network to a network interconnected server. The server under software control causes a media receiver at the customer premises to be properly tuned to receive content on-demand, and content on-demand to be played, as requested by the computing device. Advantageously, the media receiver may include a conventional set-top box that may be tuned remotely in response to a customer placing an on-demand order. As such, no additional hardware or hardware upgrades need be provided by the cable network operator to the customer to provide the content on-demand.

In accordance with an aspect of the present invention, there is provided a method of providing content on-demand to a customer having at least one tunable media receiver interconnected with a cable television network, and a computing device separate from the media receiver and in communication with a data network. The method includes receiving from the computing device over the data network, an indicator of an identity of the customer and a request for a media stream; remotely tuning one of the at least one tunable media receivers over the cable television network, to receive the content over the cable television network on a tuned channel that is not otherwise tunable by the customer; and providing the content over the cable television network for receipt and presentation by the media receiver, when tuned to the tuned channel.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of this invention.

DETAILED DESCRIPTION

Figure 1:
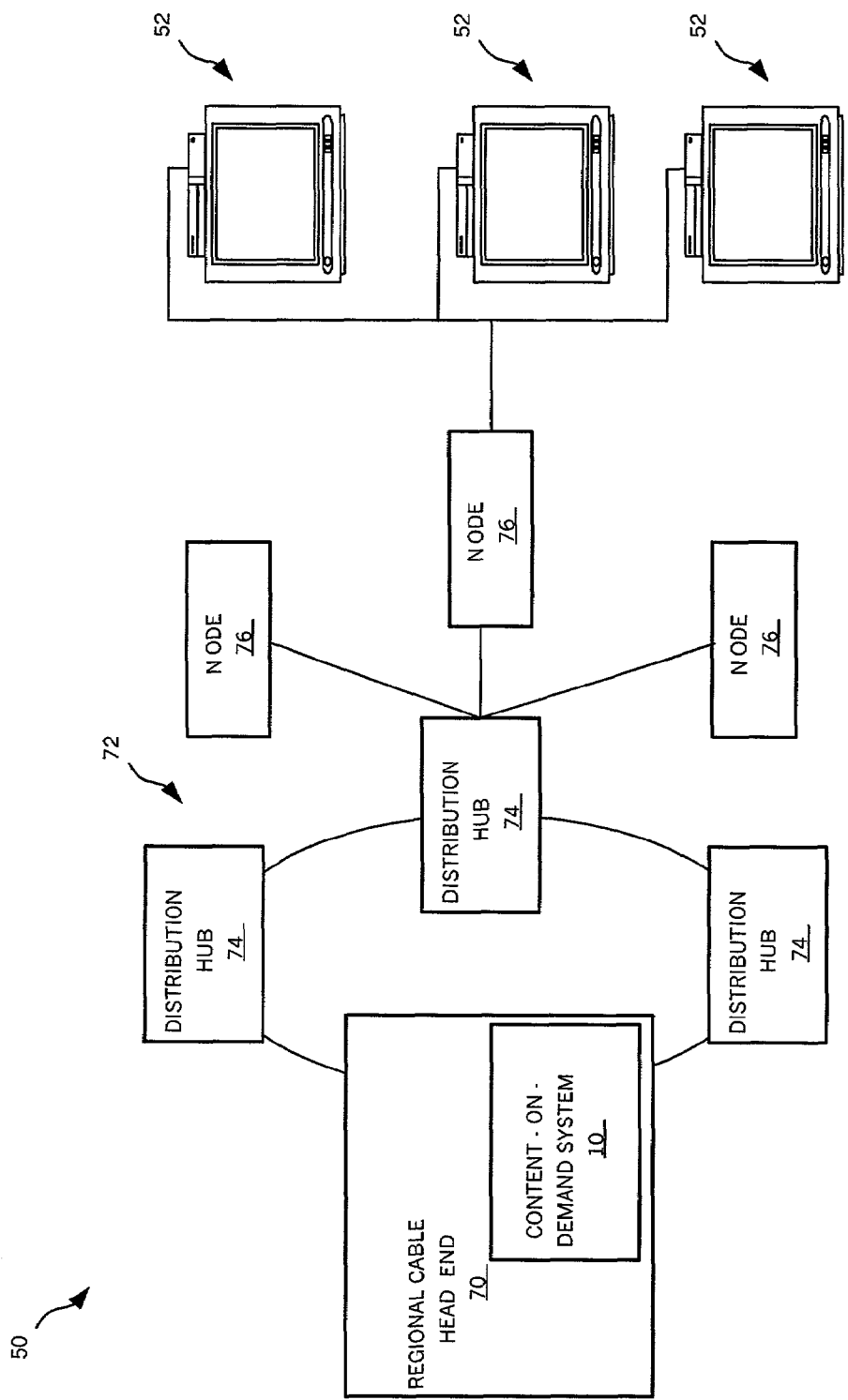
FIG. 1 illustrates an exemplary cable television network for use in association with a content on-demand system.

FIG. 1 illustrates an exemplary distribution network 50 for use in association with a content on-demand system 10. Exemplary distribution network 50 is a conventional cable television network, known by those of ordinary skill in the art. Network 50 will therefore only be briefly described herein.

As illustrated, network 50 includes a regional cable head-end 70 interconnected with a high capacity transport network 72. Transport network 72 may be a SONET, WDM, ATM or similar network or a combination of these, interconnected as a ring or star network. Transport network 72 includes a plurality of interconnected distribution hubs 74. In typically cable television networks, distribution nodes 76 are hybrid fiber-coax nodes. Each distribution node 76 provides cable television signals to multiple (typically 500-1000) customers. As will be appreciated, cable television signals are provided to customer media receivers 52 (comprising, e.g., televisions with set-top boxes) by way of coaxial cable carrying RF signals in a frequency range between 0 and 750 MHz (or greater). These RF signals are divided into RF channels, with each RF channel being a 6 MHz base-band signal. Multiple RF channels are multiplexed together to form the RF spectrum of the signals delivered over the network. Each 6 MHz RF channel in turn may carry a standard analog TV signal, or multiple streams of digital video, or other data. Each RF channel may, for example, transport multiple digital signals, that may for example represent MPEG or MPEG2 encoded video signals.

In example network 50, each distribution node 76 receives and provides to customers a 750 MHz spectrum of RF channels. The spectrum at node 76 each may be different. Although some RF channels may be common, other RF channels may be unique to a particular node. RF channels unique to a node are often referred to as RF narrowcast channels, while RF channels common to all nodes are referred to as RF broadcast channels. The spectrum for any distribution node 76 may be assembled at the cable head-end, or any combination of the cable head-end, distribution hub, and node. A unique spectrum may be created by injecting an RF narrowcast channel at the head end or at a hub into a specific RF channel for the node. The head-end may, for example, assemble the spectrum containing a plurality of broadcast RF channels to be received by all customers, and a further plurality of unique narrowcast RF channels to be received by customers at one (or several selected) node(s).

Content on-demand may be provided over network 50 to network customers receiving signals from a particular node 76, by assembling RF signals containing the content at head-end 70 and propagating them to the node 76. Content, as used herein, may include audio, motion video, multimedia content, and the like. The content is thus received by all customers served by the node 76 but is only accessible (e.g. viewed or listened to) by the customer of distribution node 76 who has ordered the content. This limited access may, for example, be achieved encrypting the content in a data stream provided on the RF channel, so that the content may be decrypted only by the customer who has ordered and paid for it.

In a conventional cable television network, video-on-demand is delivered as described above. Typically, orders are placed by way of sophisticated set-top boxes at the customer premises. Content is contained in data streams containing MPEG or similar data. As noted, however, most cable television customers do not have set-top boxes capable of providing a suitable user interface to navigate, order and control content large libraries of content on-demand. As such, in a manner exemplary of the present invention, exemplary system 10 enables customers with customer premises equipment that may otherwise be ill-suited for the navigation available content on-demand, to browse available content on-demand, order it, and control its playing, using a data network and a conventional computing device.

Figure 2:
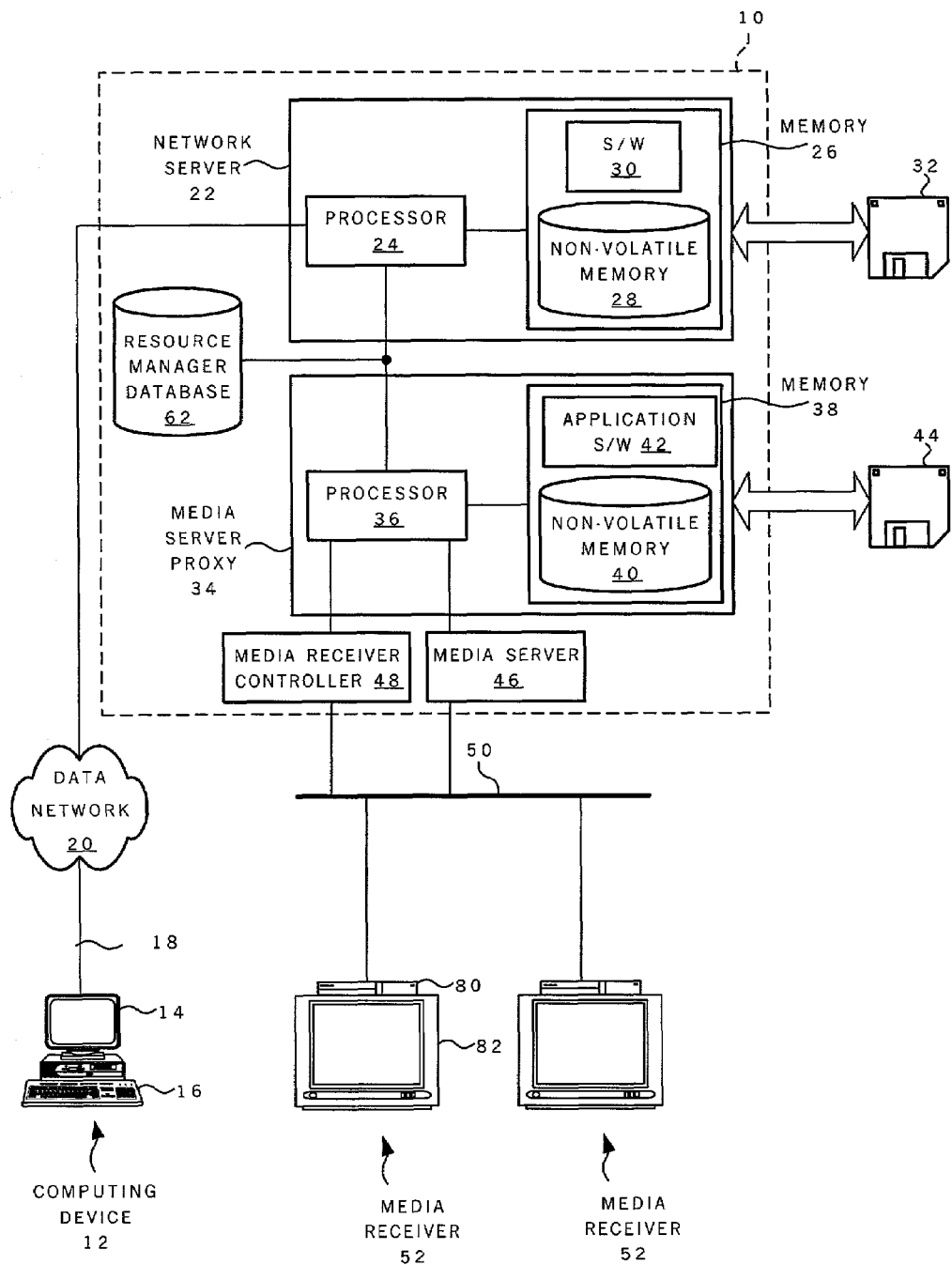
FIG. 2 illustrates a system for delivering content on-demand, exemplary of an embodiment of the present invention.

FIG. 2 illustrates system 10 for delivery of content on-demand, exemplary of an embodiment of the present invention. System 10 is preferably installed at the premises of an associated distribution network operator at, for example, cable head-end 70 of distribution network 50 as shown in FIG. 1.

System 10 is in communication with content on-demand customers in two ways. First, system 10 is interconnected with distribution network 50 to which customer media receivers 52 are connected. Second, system 10 is interconnected with a data network 20 to which a customer computing device 12 may be connected. As will become apparent, data network 20 provides two-way communications with customers for the purpose of providing customers with a suitable interface for navigating and selecting content on-demand, placing on-demand orders and controlling its delivery and playing. In the present embodiment, data network 20 is the public internet. Of course, data network 20 could be a private data network, or a data network other than the internet.

As illustrated in FIG. 2, in one embodiment, exemplary system 10 includes a network server 22; a database 62; a media server (MS) 46; a media receiver controller 48; and a media server proxy 34.

Network server 22 is a conventional network aware computing device such as a Microsoft NT server; Linux server, or the like. Example server 22 includes a computer network interface physically connecting server 22 to data network 20, and a processor 24 coupled to conventional computer storage memory 26. Example server 22 may further include input and output peripherals such as a keyboard, display and mouse (not illustrated). As well, server 22 may include a peripheral (also not illustrated) usable to load software 30 exemplary of the present invention from a software readable medium, such as medium 32, into its memory 26 for execution. Alternatively, or in addition, software 30 may be stored in non-volatile memory 28.

Software 30 may include conventional operating system software; a hypertext transfer protocol ("HTTP") server application; and integration software, exemplary of embodiments of the present invention.

The operating system software may, for example, be the Linux operating system software; Microsoft® Windows 2000® operating system software; or the like. This operating system software preferably also includes a TCP/IP stack allowing communication of server 22 with data network 20.

The HTTP server application is preferably an Apache, ColdFusion®, Netscape®, Microsoft® IIS or similar web server application, also in communication with the operating system and a database 62 (described below). The HTTP server application allows server 22 to act as a conventional HTTP server, and thus provide a plurality of HTTP pages for access by network interconnected computing devices. HTTP pages that make up these pages may be implemented using one of the conventional web page languages such as hypertext mark-up language ("HTML"), Java™, ASP, Javascript or the like. These pages may be stored as files within stored in non-volatile memory 28.

The integration software adapts server 22, in combination with database 62 (described below), its operating system and HTTP server application, to function in manners exemplary of embodiments of the present invention. The integration software acts as an interface between the database 62 and the HTTP server application and may process requests made by interconnected computing devices. In this way, the integration software may query and update entries of database 62 in response to requests received over network 20, in response to interaction with presented web pages. Similarly, integration software may process the results of customer input and queries, and present results to database 62, as detailed herein. Integration software may for example, be suitable CGI or Perl scripts; Java™; Microsoft® Visual Basic® application, C/C++ applications; or similar applications created in a conventional ways by those of ordinary skill in the art.

Database 62 is a conventional database that may be hosted on a separate database server (not specifically illustrated) or co-hosted with either proxy 34 or server 22. Database 62 may be a relational or object-oriented database for example. The database 62 is accessible by the application software of server 22 by way of a database engine (not illustrated). This database engine may be a conventional relational database engine, such as Microsoft® SQL Server, Oracle®, DB2, Sybase®, Pervasive® or other database engine known to those of ordinary skill in the art. The database engine typically includes an interface for interaction with operating system software at server 22 and proxy 34, and other application software, such as integration software at server 22. Ultimately, this database engine is used to access, add, delete and modify records at database 62. As will be appreciated, records within database 62 are used to create and track content on-demand orders. The database 62 is accessible (read/write access) by both the server 22 and proxy 34.

Media server 46 ("MS") is a content on-demand server, capable of content storage and playing on-demand over an interconnected distribution network. In one embodiment, media server 46 is a conventional cable network content on-demand delivery server, such as an nCUBE® n4 Media Hub; Concurrent Computer Corporation® Media Hawk; or similar commercially available device. Media server 46 includes storage facilities for storing content on-demand; a control network interface for receipt and provision of control communications; and a distribution network output. Media server 46 may store a variety of different content types, including data in MPEG, MPEG 2, MPEG 4 or other formats representing video in NTSC, ATSC or other formats; digitized audio, in PCM, MP3, Real Audio, Microsoft Media or other formats, or mixed video/data and the like. Media server 46 receives control information for delivery of content on-demand to specific delivery network nodes by way of its control interface, and provides content on-demand to customers by way of its distribution interface, in a conventional manner, and as detailed below. Media server 46 may inject an digital stream carrying content delivered on-demand (typically an MPEG 2 stream) into a specific RF channel destined to a particular distribution node 76 (FIG. 1).

Media receiver controller 48 is a control device capable of remotely controlling operation of media receivers 52 at customer premises. In the illustrated embodiment, controller 48 is an out of band modulator capable of creating out-of band signals for controlling existing media receivers (detailed below), typically in the form of set-top boxes, by injecting a suitable control signals within an out-of-band control channel provided to set-top boxes at node s 76. Controller 48 also receives control information by way of a suitable control interface, such as an Ethernet interface, or the like. An example controller 48 may include a Motorola Digital Headend OM 1000, Scientific Atlanta Digital Network Control System, or the like.

Media server proxy 34 acts as an interface between media server 46, controller 48 and network server 22. Proxy 34 is also conventional computing device, and includes suitable communications interfaces and software to communicate with network server 22 and media server 46. Proxy 34 includes a processor 36, in communication with memory 38. Memory 38 may store application software 42, adapting proxy 34 to function in manners exemplary of the present invention. Proxy 34 may further include input and output peripherals such as a keyboard, display and mouse (not illustrated). As well, proxy 34 may include a peripheral (also not illustrated) usable to load application software 42 exemplary of the present invention from a software readable medium, such as medium 44, into its memory 38 for execution. Alternatively, or in addition, software 42 may be stored in non-volatile memory 40.

For simplicity controller 48, media server 46, server 22 and proxy 34 may all include suitable Ethernet interfaces for interconnection, and exchange of control information and data. They may, for example, be interconnected in a private local area network. In this way, server 22, proxy 34, controller 48, and media server 46 may communicate with each other using conventional network and control protocols, supported by those devices, and understood by application software 30 and 42.

As noted, system 10 is in communication with at least two appliances at each customer premises that are used to order, receive and control content on-demand, namely, a computing device 12 and one or more media receivers 52 (sometimes referred to as client display terminals (CDTs)).

Computing device 12 is a network aware appliance that presents a user interface for the ordering and control of content on-demand. Device 12 is in communication with the data network 20 over link 18. Link 18, may for example be a telephone link, wireless network link, ADSL or ISDN link, or the like. Through communication with data network 20, device 12 is capable of communicating with network server 22 of system 10. Device 12 may be a conventional home computing device including a processor, memory, interface peripherals, keyboard, and monitor. Alternatively, device 12 may be any other network aware device capable of controlling content on-demand, in manners exemplary of the present invention. Device 12 may, for example, be a cellular telephone, personal digital assistant, mobile computing device (such as a "Web Pad"), or the like.

In one embodiment, exemplary device 12 is pre-loaded with software that is capable of downloading and presenting internet content in the form of web-pages or the like. Device 12, may for example, store and execute a suitable web browser such as a Microsoft® Internet Explorer, Netscape® Navigator/Communicator, Opera or similar web browser.

Media receiver 52 is a tunable device or combination of devices, capable of tuning to a channel carrying content on-demand, extracting and presenting this content. Multiple receivers 52 may be situated at a customer residence. Optionally, media receiver 52 may include an integrated display or listening device 82, such as a television, audio amplifier, monitor or the like. Alternatively, media receiver 52 may present content to another device for display or listening. Media receiver 52 may, for example, be formed as a conventional set-top box 80, for receipt and decoding of MPEG 2 streams by way of cable network 50. The content on-demand channel may be a digital stream delivered to the receiver 52 from and interconnected node 76, and provided by media server 46.

Typical example set-top boxes 80 include Motorola® models DCT 1000, DCT 1200, DCT 2000, DCP 501, and DCT 503; Scientific Atlanta Explore models 2000 and 3000; Pace Microsystems models Pace500 and Pace700; or other comparable available devices.

Characteristically, the enumerated set-top boxes may be tuned to a channel transporting content on-demand by being tuned to receive and decode specific digital media streams modulated within specified RF channels. Tuning of these example set-top boxes to a tuned channel carrying content on-demand, may be effected by remotely tuning an example box to receive a particular RF channel to extract an identified MPEG 2 stream within this RF channel. Remote tuning commands may be issued by controller 48, for receipt in a defined control channel at the customer set-top boxes interconnected with a distribution node 76. Other example media receivers could be remotely tuned in other ways readily appreciated by those of ordinary skill. For example, conceivably some media receivers could be tuned to receive a channel within a multiplexed data stream without being tuned to a specific RF channel.

Figure 3:
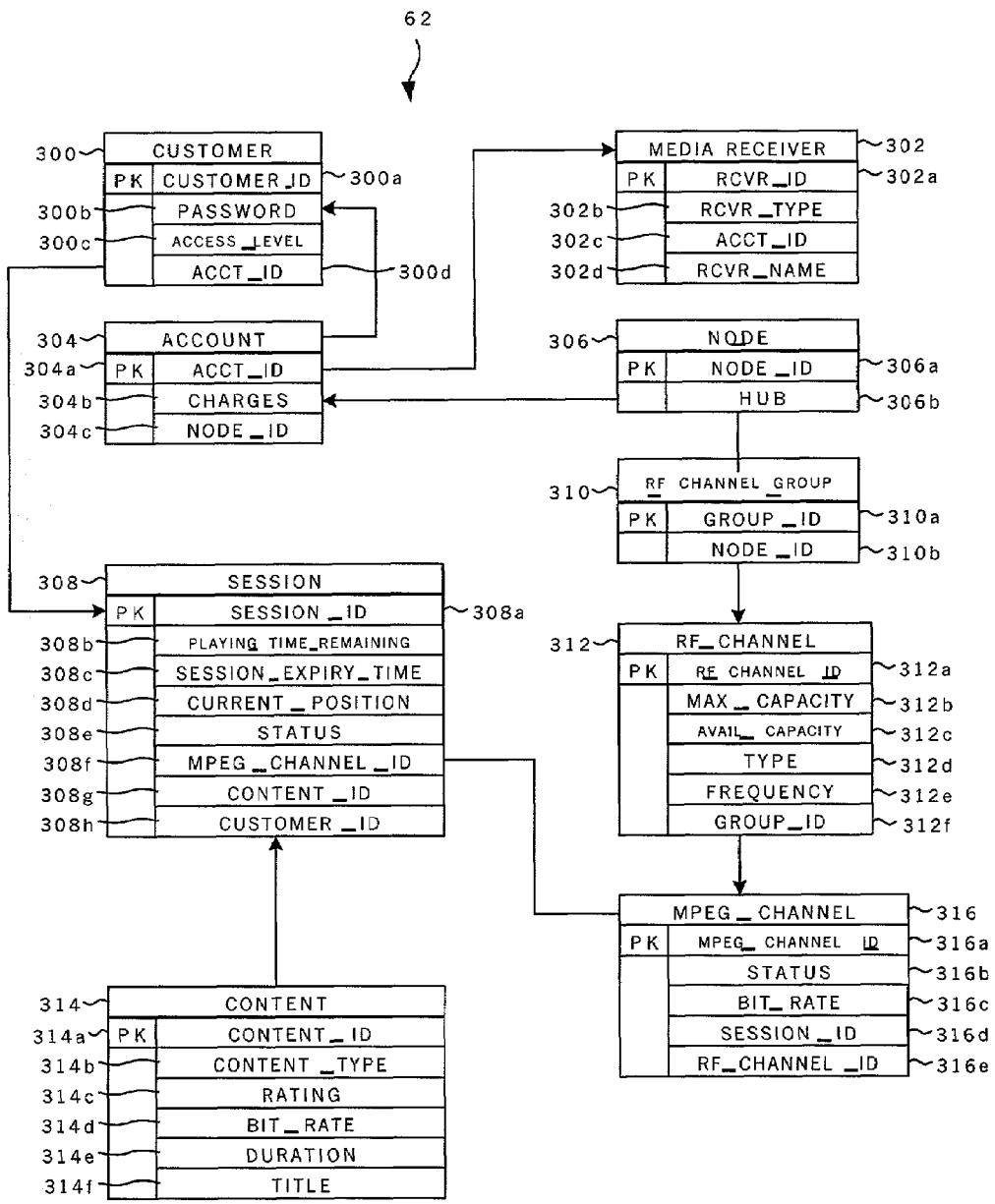
FIG. 3 illustrates a simplified organization of a database used by the system of FIG. 2.

FIG. 3 illustrates in greater detail exemplary database 62. The database 62 contains account, session, channel and other information used to establish and maintain content on-demand sessions between the multimedia server 46 and media receivers 52. In the illustrated embodiment, database 62 is a relational database.

As illustrated in FIG. 3, example database 62 is organized as a plurality of tables that may be queried by a database engine using conventional (e.g. SQL) commands. Specifically, example database 62 includes a customer table 300 (CUSTOMER); media receiver table 302 (MEDIA_RECEIVER); account table 304 (ACCOUNT); node table 306 (NODE); session table 308 (SESSION); RF channel group table 310 (RF_CHANNEL_GROUP); RF channel table 312 (RF_CHANNEL); content table 314 (CONTENT); and MPEG channel table 316 (MPEG_CHANNEL).

It will be appreciated that the illustrated structure of database 62 is simplified. Depending on the nature of additional features of system 10, that are not detailed herein, database 62 may include many more tables. Similarly, each illustrated table may include many more columns (or fields) than those detailed herein.

As will become apparent, for any particular distribution node 76, populated node table 306, RF channel group table 310, RF channel table 312 and MPEG channel table 316 provide complete information about bandwidth used and available for delivery of content on-demand on network 50. For any particular customer, customer table 300, media receiver table 302 and account table 304 store information about the customer's account preferences and customer premises equipment on network 50. As content is ordered, information about the ordered content identifying both the customer ordering the content and the network resources used to deliver the content is stored in session table 308 and MPEG channel table 316. Content table 314 further stores information about content that is available for on-demand delivery.

As illustrated, node table 306 stores a record identifying each distribution node 76, capable of delivering content on-demand. Node table 306 includes a node identifier field 306a (NODE_ID) and a hub field 306b (HUB) identifying an associated hub 74.

RF channel group table 310 identifies RF channels used for delivering content on-demand at a particular distribution node 76. RF channel group table 310 includes an RF channel group identifier field 310a (GROUP_ID) and node identifier field 310b (NODE_ID) used to store an identifier of the node associated with the identified channel group.

RF channel table 312 stores information about the use and availability of each RF channel within an RF channel group at a particular node. Each RF channel is preferably reserved for transporting data receivable by a particular type of set-top box. RF channel table 312 includes an RF channel identifier field 312a (RF_CHANNEL_ID); a maximum RF channel capacity 312b (MAX_CAPACITY); an available RF channel capacity field 312c (AVAIL_CAPACITY); a channel type field 312d (TYPE); and frequency (FREQUENCY) 312e. A further field 312f (GROUP_ID) stores an identifier of the RF channel group of which the current RF channel is a part—linking the RF channel to a group of RF channels that can be correlated to one or more nodes. Certain fields (e.g. field 312b (MAX_CAPACITY)) of the RF channel table 312 are populated on system initialization and remain static during system operation, while others (e.g. field 312c (AVAIL_CAPACITY)) may be dynamically updated based on current system conditions.

In the example embodiment, some RF channels are reserved for use with set-top boxes capable of receiving 256 QAM signals; others are reserved for 64 QAM signals. As such, the maximum bandwidth (e.g. 37.8 Mbps for 256 QAM or 27 Mbps for 64 QAM) of a particular channel is stored in MAX_CAPACITY field 312b. The currently available channel capacity (i.e. unused bandwidth), which is initially set to the maximum capacity for the channel, is maintained in the AVAIL_CAPACITY field 312c. As noted, field 312c may be updated dynamically as an RF channel is used to carry content on-demand. The channel type is stored in TYPE field 312d. This indicator can used to identify that the particular modulation scheme used for that channel [e.g. 64 vs. 256 QAM, etc.].

Account table 304 stores records associated with customer accounts. Account table 304 includes fields for storing data representative of an account identifier 304a (ACCT_ID); accumulated charges 304b (CHARGES) for storing accrued charges for ordered content on-demand; and a node identifier 304c (NODE_ID) of the node with which the customer account is associated (the latter typically being determined by the customer's geographical location). Each entry in account table 304 may be associated with multiple customers. For example, an account may be associated with multiple family members.

Customer table 300 stores records identifying customers of the content on-demand system 10. Customer table 300 thus includes fields for storing data representative of a unique customer identifier 300a (CUSTOMER_ID); password 300b (PASSWORD); and content access level 300c (ACCESS_LEVEL). Also included in customer table 300 is an ACCT_ID field 300d for containing an identifier of the account with which the customer is associated. The access level stored in field 300c is a rating level (e.g. a Motion Picture Association (MPA) rating such as "PG" or "G") and may be used to limit available content for certain customers, e.g., certain household members.

Media receiver table 302 stores information regarding media receivers 52 of the customers of the content on-demand system 10. Each entry of media receiver table 302 includes a field suitable for containing a unique media receiver identifier (RCVR_ID) 302a and receiver type (RCVR_TYPE) 302b. The receiver type field 302b used by the system 10 to ascertain the capabilities of a customer media receiver, and may include an indication of the make and model of a customer's set-top box 80, for example. Also included in media receiver table 302 is an ACCT_ID field 302c identifying the account with which the receiver is associated. Receiver table 302 further includes a media receiver name field 302d (RCVR_NAME) for storing a receiver name recognizable by the customer (e.g. "living room TV").

Node table 306 stores information about each distribution node 76 on network 50 capable of providing content on-demand. The node is uniquely identified in field 306a (NODE_ID), and the hub 74 with which the node is associated is identified in field 306b.

RF channel group table 310 identifies the RF channel group allocated for use in delivery of content on-demand to customers for each distribution node 76 of network 50. Each group is uniquely identified by a group identifier (GROUP_ID) in field 310a. An identifier of the associated node is stored in the NODE_ID field 310b. Conveniently, one or more RF channels can be related to one or more nodes.

As may be appreciated, tables 306 and 312 are typically populated by a network operator upon set-up of system 10. RF channel group table 310 may similarly be partially populated upon network configuration with data representative of the system's node and RF channel configuration, by an operator of network 50. Barring any reconfiguration by this operator of network 50, the initial configured values of these records may persist unchanged throughout the operation of system 10.

Within each RF channel of the present embodiment, multiple channels capable of carrying content on-demand to customers are pre-allocated. In an example embodiment, content is encoded as MPEG data, and these channels are thus referred to as MPEG channels. Each MPEG channel is thus associated with an RF channel, and moreover has an MPEG ID unique to that RF channel. In this arrangement, the combination of an RF channel ID and an MPEG ID is sufficient to allow a channel to be tuned. MPEG channel table 316 stores information about these MPEG channels. Channel table 316 includes fields for storing an MPEG channel identifier 316a (MPEG_CHANNEL_ID); an operative transmission bit rate 316c (BIT_RATE); and a session identifier 316d (SESSION_ID) of the associated session; and an RF channel identifier 316e (RF_CHANNEL_ID) of the containing RF channel. An MPEG channel status 316b field stores information indicative of the current use of the MPEG channel. If the MPEG channel is currently being used by a session it is set to a 'used' state. When the channel is available for use by the system 10 it may be set to a 'free' state. In the present embodiment, MPEG channel table 316 is a pre-built table of all the MPEG channels. Currently set-top box software requires that the MPEG channel in system 10 match the MPEG channel maps configured on the set-top boxes. Thus the MPEG channel table 316 is typically created to match the MPEG channel to which the set-top boxes may be tuned. Alternatively, table 316 can be a dynamically established with rows created and deleted based upon orders.

Content table 314 stores information about the content that is available for on-demand delivery by the system 10. Content table 314 includes fields for storing a content identifier 314a (CONTENT_ID); a content type 314b (e.g. video or audio) (CONTENT_TYPE); a content rating 314c (RATING); a bit rate 314d at which the content is to be streamed (BIT_RATE); a duration 314e (DURATION), i.e. the playing time of the content; and a content title 314f (TITLE) for presentation to a customer. Content table 314 is typically updated as content is added to or removed from media server 46.

Session table 308 stores information about in-progress customer content on-demand delivery sessions. Session table 308 includes fields for storing a unique session identifier 308a (SESSION_ID); a playing minutes remaining value 308b (TIME_REMAIN); a session expiry time 308c (EXPIRY_TIME); a current position (i.e. the current playing position of the content, in elapse minutes for example) 308d (CURRENT POSITION); a session status (e.g. playing, paused, stopped, etc.) 308e (STATUS); an associated MPEG channel identifier 308f (MPEG_CHANNEL_ID); an identifier of the associated selected content 308g (CONTENT_ID); and an associated customer identifier 308h (CUSTOMER_ID).

Upon customer registration for receipt of content on-demand delivery, the customer table 300, account table 304, and receiver table 302 are populated with records representative of the current customers to the system 10. Customer registration may occur at any time following system initialization.

More specifically, when a customer registers to receive content on-demand, a customer record is created within customer table 300. A unique identifier is assigned to the customer and stored within the record's CUSTOMER_ID field 300a. The customer may be associated with an existing account. For example, if the new customer shares a residence with an existing customer having an established account, the customers may wish to share the account for convenience of billing reasons. Alternatively, if the customer does not wish to be associated with an existing account, a new account record is created. A unique identifier is created and used to populate ACCT_ID field 304a; the CHARGES field 304b is initially zeroed (to reflect no purchased content on-demand to date); and the NODE_ID in field 304c is populated with an identity of the node with which the customer is associated as a result of geographic location. Regardless of whether the account with which the customer is associated is newly created or existing, the ACCT_ID field 300d of the customer record is set to refer to that account.

The customer record in customer table 300 is further populated with a password and access level stored in fields 300b and 300c respectively. The access level defines an upper limit for the rating of content that may be delivered to the customer in question. For example, assuming that Motion Picture Association (MPA) ratings are used, an access level of "PG" may indicate that only "PG" or "G"

rated content may be delivered to the customer. Other (i.e. non-MPA) rating systems may be employed. It will be appreciated that access levels are associated with customers rather than with accounts. Thus two customers who share an account may have different access levels.

It will be appreciated that at least one media receiver record (associated with a media receiver 52 of the customer) will be associated with the customer's account. This record may either be created in media receiver table 302 upon customer registration (e.g. when a new customer account is created) or may be pre-existing in table 302 (e.g. when a new customer is added to an existing account). When the media receiver record is created, a unique RCVR_ID is assigned and stored in field 302*a*, and the RCVR_TYPE field 302*b* is populated with a value indicative of the media receiver's capabilities (e.g. a set-top box make and model). Moreover, the ACCT_ID field 302*c* is populated with the ID of the associated account. As well, a string comprising a name of the media receiver that is recognizable by the user (e.g. "living room TV"), for which the registering customer may be prompted, is stored in the RCVR_NAME field 302*d*. It will be appreciated that an account may be associated with more than one media receiver. Thus, multiple records in table 302 may be associated with a single account.

After creation of a suitable entry within customer table 300, account table 304, and media receiver table 302, database 62 stores sufficient information to permit a customer to access system 10 to place on-demand orders. At this time, a registered customer may access system 10 to place on-demand orders.

Figure 8A:
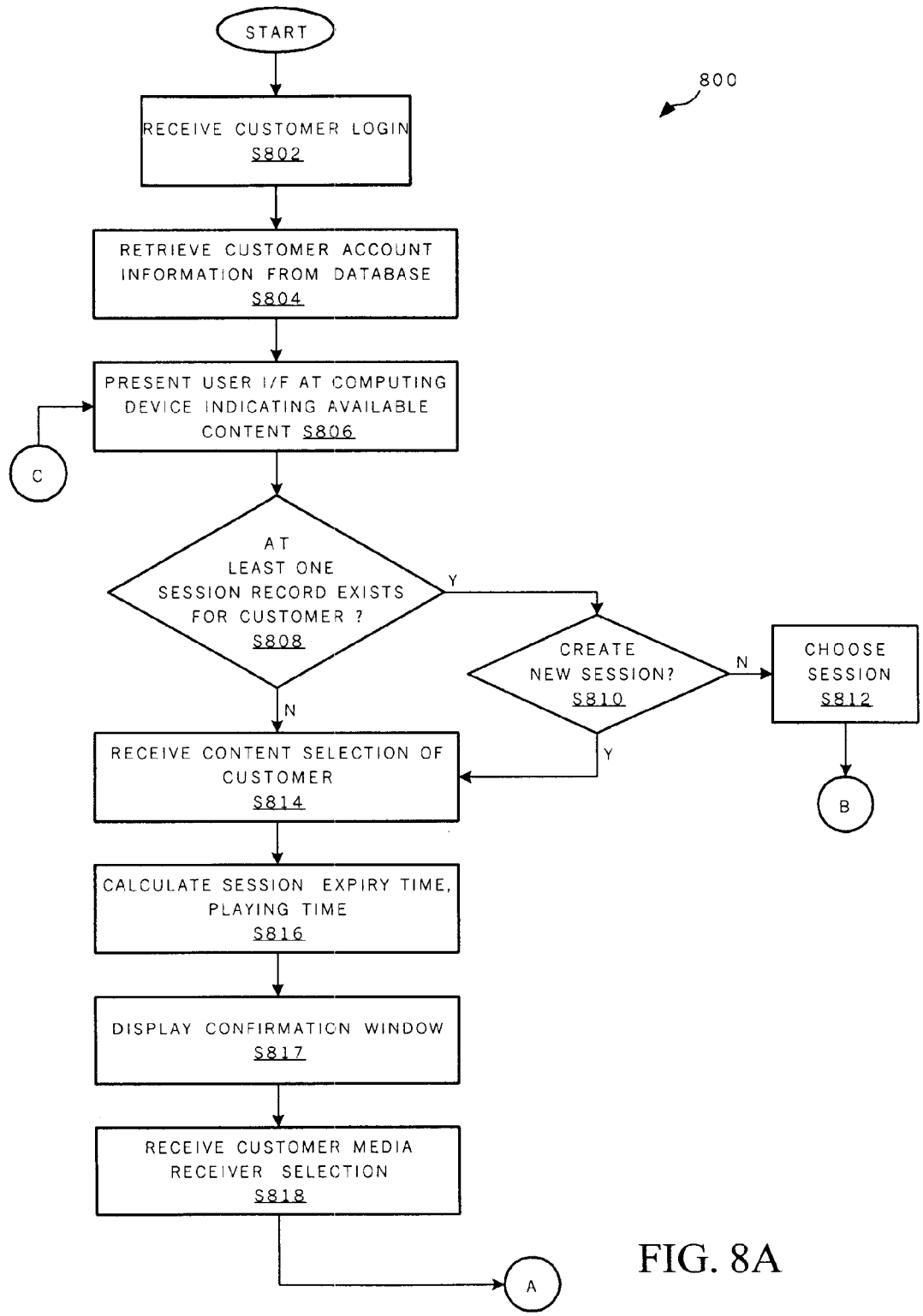
FIGS. 8A, 8B and 8C is a flowchart illustrating exemplary steps executed at a network server of the system of FIG. 2.
Figure 8B:
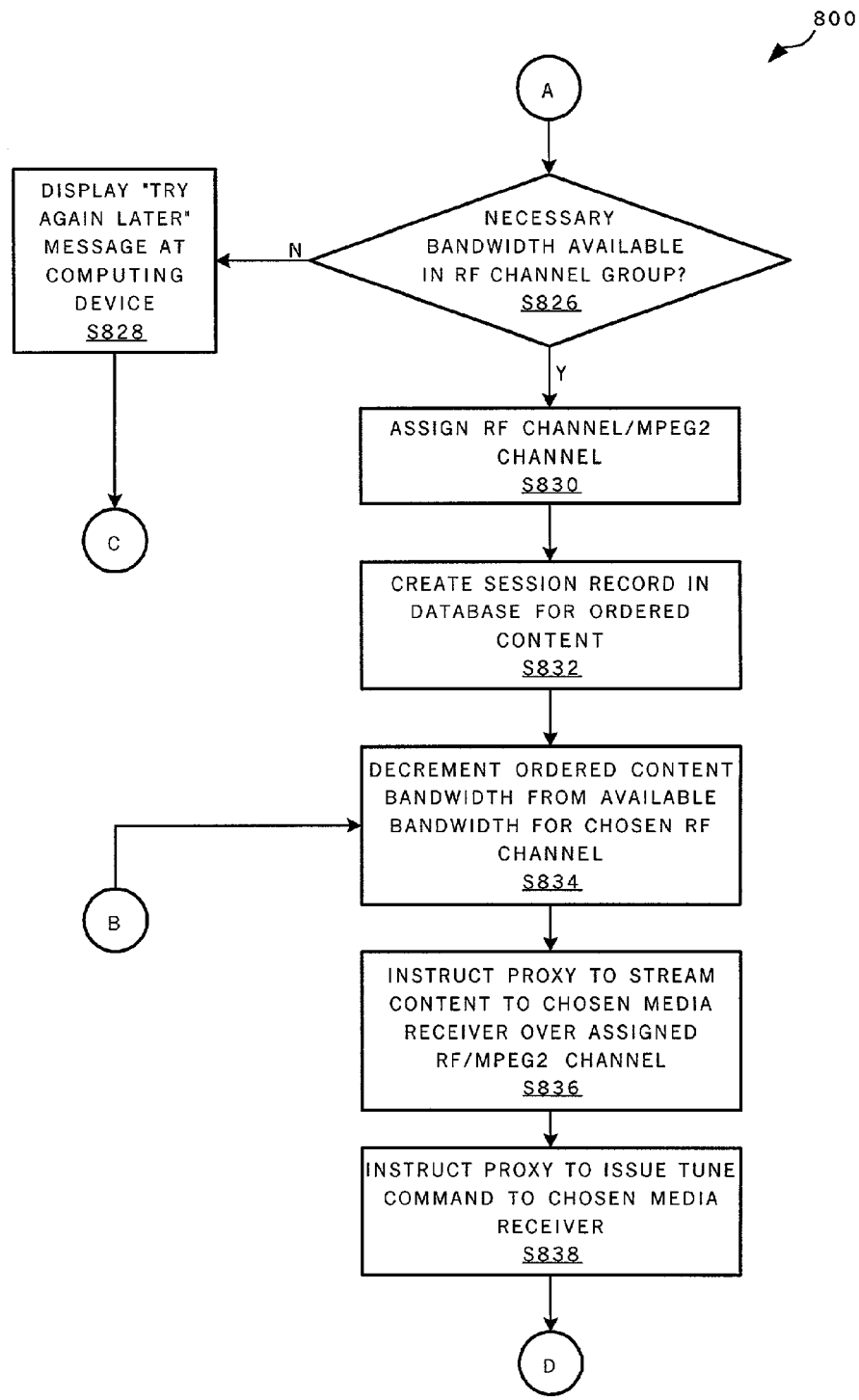
Figure 8C:
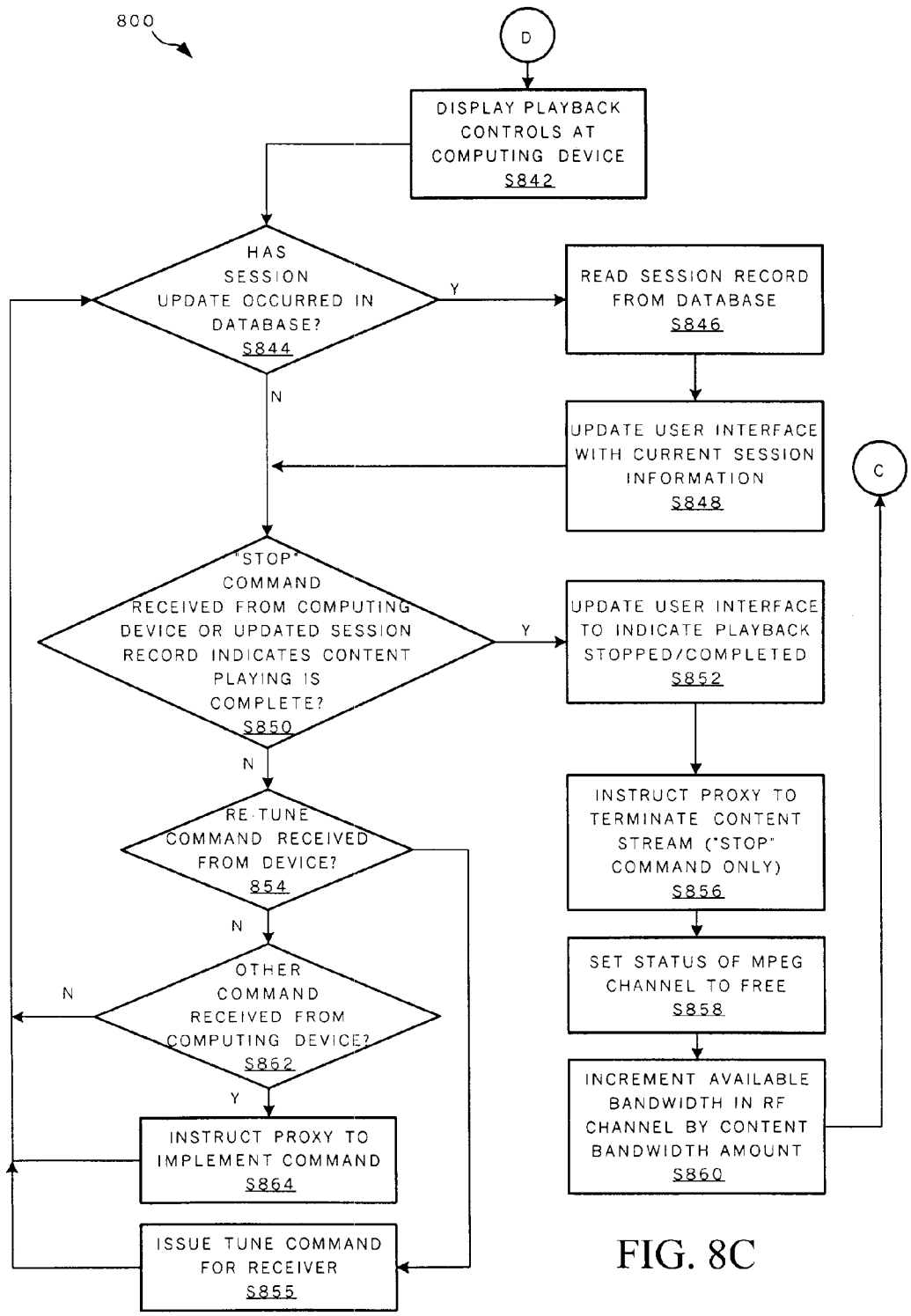

In operation, a customer may order content on-demand after the customer has been registered at system 10, and suitable records of tables 300, 302, 304 and 316 have been populated as described above. Specifically, a customer may initially contact system 10 by establishing a data network session with server 22 using data network 20. This may be done by simply using a conventional web browser at device 12 to contact server 22 using a published internet URL. Steps 800 performed at server 22 under control of software 30 are illustrated in FIGS. 8A-8C.

Once contacted, server 22 prompts the customer for a customer log-in and password in step S802. Once log-in and password are received, server 22 queries database 62 to authenticate the customer against entries within customer table 300. That is, software 30 assesses if a record with matching CUSTOMER_ID (field 300*a*) and password (field 300*c*) exists. If so, the customer is appropriately authenticated, and server 22 may retrieve account information from tables 300-316 of database 62 in step S804.

Next, in step S806 server 22 presents to device 12 a suitable user interface including one or more windows or screens for ordering and controlling delivery of content on-demand. As will be appreciated, the exact nature of the user interface may depend largely on the nature of device 12. The user interface may be presented in many ways. For example, the user interface may be an interface presented in a graphical operating system. It could include one or more windows presented as the result of software at the device. It could similarly include multiple screens. Alternatively, it may only include a few characters or symbols presented on a less capable device. The user interface may, for example, be provided to device 12 as a Java applet stored within files in non-volatile memory 28 and provided over network 20. Alternatively, the interface may be provided by way of a conventional HTML page, or the like.

In the illustrated embodiment, the user interface includes multiple windows. Each illustrated window may be presented in a separately managed browser window at device 12. Alternatively, the content of these windows could be presented in any number of ways—as separate screens; as a single window; or the like.

In step S808, server 22 determines whether the particular customer has an in-progress content on-demand session. This may be accomplished by querying SESSION table 308 for entries identifying the customer in question by CUSTOMER_ID in field 308*h*.

If no sessions are in progress, network server 22 may prompt the customer for content to be ordered at device 12, and receive the content selection of the customer, in step S814. Possibly, the user interface presented to the user may present a list of currently available offerings, extracted from content table 314 of database 62. Optionally, preview data in the form of graphics, sound clips, streaming video trailers, or the like may be presented as part of the user interface provided over network 20, in a conventional manner. These may also be stored within non-volatile memory 28 or at database 62. Conveniently, only those offerings consistent with the operative customer access level need be presented (e.g. for parental control). Offerings may be filtered by ensuring that rating field 314*c* for each offered content is consistent with access level stored in field 300*c* for the customer.

As will be appreciated, the variety of content available on-demand that may be offered is only limited by the storage capacity associated with media server 46. As such, the list of available titles presented to device 12 may be extremely broad. Conveniently, software and HTML files at server 22 may easily be arranged to present content in an easily accessible manner at device 12. Content may, for example, be ordered, hyper-linked, and searched in various ways. Typically, the title of the content is displayed, optionally along with its duration and rating; this information is retrieved from fields 314*f*, 314*e* and 314*c* (respectively) of content table 314. Conveniently, content may be grouped by content type (e.g. video, audio, etc.) for example, as discerned from field 314*b*. Advantageously, the flexibility of locating software at server 22 in combination with a relatively capable browsing device at device 12 provide the network operator great flexibility, and may offer the customer a familiar framework (e.g. web search tools) for finding desired content.

Once an order is received in step S814, a total allowed maximum playing duration and session expiry time may be calculated in step S816. The maximum playing duration is preferably based on the length of the ordered content (as for example, stored in field 314*c* for the content), and may be a multiple thereof. In the preferred embodiment the maximum playing duration is set to equal 2.5 times the length of the content. As well, the session expiry time may be set to define a particular time window (e.g. ordering time plus 24 hours). As will become apparent, maximum playing duration and session expiry time are used by system 10 to limit how often and for how long a customer may play a piece of content delivered on-demand. Specifically, as will become apparent, a customer may play an ordered piece of content for exactly the amount of viewing/listening time allotted and specified by the maximum playing duration. However, the content can only played back after the order is placed and before the expiry time.

Figure 4:
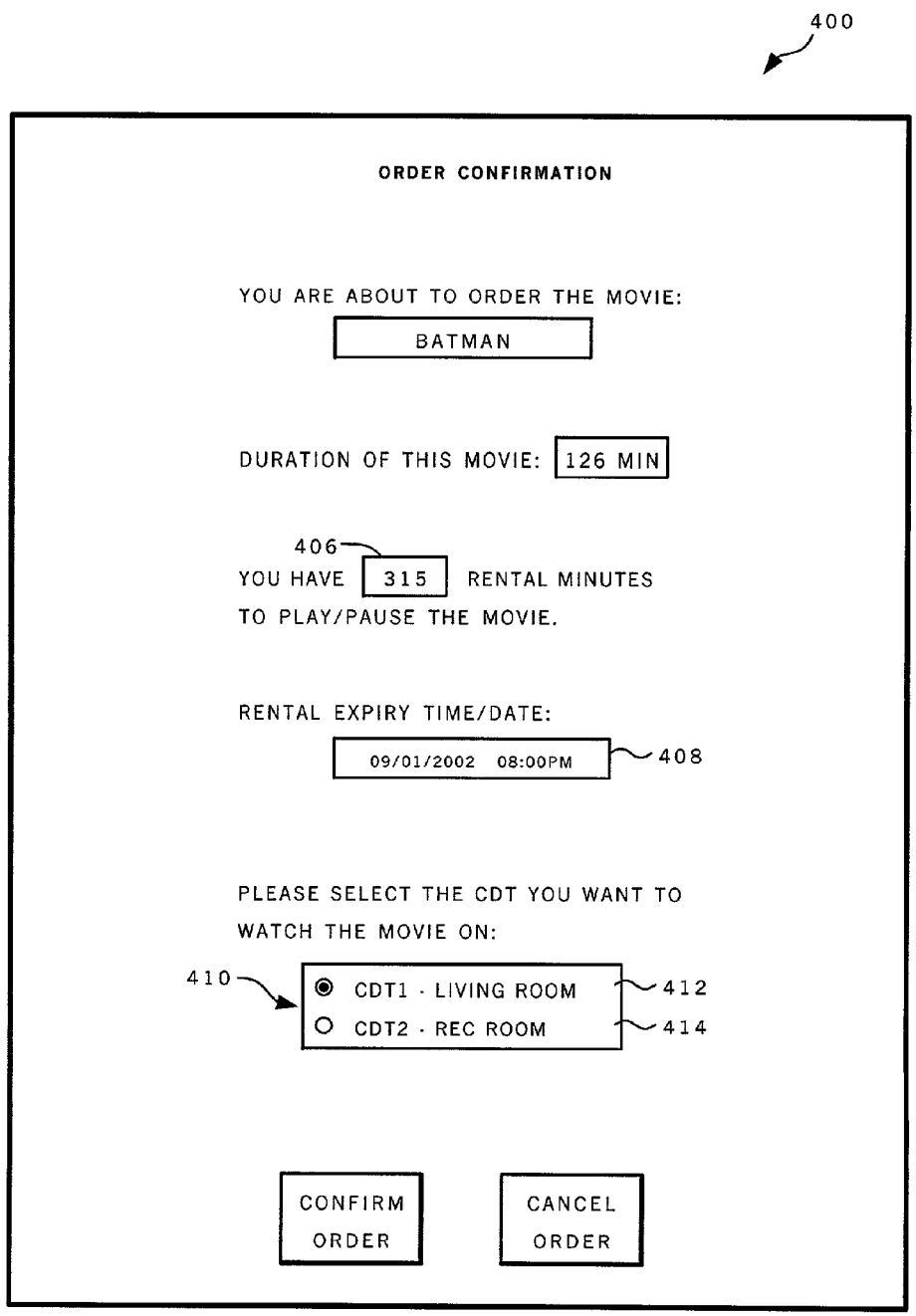
FIGS. 4-7 illustrates windows forming part of a user interface for ordering and controlling playing of content on-demand.

In step S817 a confirmation window or screen may be presented to the customer, at device 12. An example confirmation window 400 is illustrated in FIG. 4. As illustrated, the expiry time and remaining playing duration are presented as part of this window 400.

Confirmation window 400 may further prompt for the input of additional information, provided to server 22 in step S818. For example, as illustrated, confirmation window 400 includes input field 410 for receiving an identifier of one or more customer media receivers 52, as associated with the particular customer in media receiver table 302 of database 62. The list of client display terminals may be formed from the contents of media receiver table 302, displaying all media receivers associated with the subject customer, for example by name as stored in field 302*d*.

Once the order has been confirmed, server 22 verifies that sufficient allocated bandwidth remains available to deliver the content on-demand to the customer over network 50. That is, as bandwidth is allocated on a per-node basis, and this bandwidth is shared among all customers at the node, server 22 ensures that sufficient bandwidth exists for the subject on-demand order.

Specifically, in step S826, server 22 queries node table 306 of database 62 to identify the distribution node 76 associated with the customer. Next, server 22 queries RF channel group table 310 and RF channel table 312 to attempt to locate an RF channel within the RF channel group associated with distribution node 76 for transporting content on-demand. The RF channel type (as stored in TYPE field 312*d*) should be compatible with the modulation scheme understood by the set-top box 80 at the customer premises (as assessed from RCVR_TYPE field 302*b*), and having sufficient remaining bandwidth (as determined from the AVAIL_CAPACITY field 312*c*) to carry desired content. If it is determined in step S826 that no such RF channel is available, a message may be displayed in step S828, the order process may be aborted, and steps S806 and onward may be repeated.

If the required bandwidth is available, an RF channel is identified, and a pre-allocated channel for carrying an MPEG 2 stream is chosen within this RF channel in step S830. The pool of MPEG IDs of the pre-allocated channels is divided into ranges or blocks, with each range being associated with a particular content rating. The MPEG channel is chosen such that its MPEG ID is in a block with an access level corresponding to the chosen content. This minimizes the likelihood of inadvertently streaming content of an unsuitable rating to a customer. The associated MPEG channel record within table 316, is populated with a bit rate in its BIT_RATE field 316*c* that is indicative of the channel's bit rate. The bit rate may, for example, depend on the nature of the content, requested by the customer and may be determined from the BIT_RATE field 314*d* of the associated content record. The STATUS field 316*b* is populated with a status indicator of "used" to reflect the current channel status.

Additionally, a session record reflecting the placed content on-demand order and ensuing session is created in SESSION table 308, in step S832. Specifically, a newly formed record in SESSION table 308 is populated with a unique session ID in field 308*a*, which ID also populates the SESSION_ID field 316*d* of the associated MPEG channel record in table 316. Total rental minutes and expiry time calculated in step S816 are stored within fields 308*b* and 308*c*, respectively. The allocated MPEG ID (in an associated record of table 316) is stored in field 308*f*, and an identifier of the ordered content is stored in field 308*g*. Current position field 308*d* of the ordered content is populated with a value reflecting the commencement of the provision of content. Status field 308*e* is populated to indicate that content is being streamed (i.e. played). Further, MPEG_CHANNEL_ID field 308*f*, CONTENT_ID field 308*g*, and CUSTOMER_ID field 308*h* are populated with appropriate values associating corresponding records within tables 316, 314 and 300 respectively.

As well, the AVAIL_CAPACITY field 312*c* for the relevant RF channel is updated in step S834 to appropriately decrement the available bandwidth of the RF channel carrying the stream. Further, the account charges in field 304*b* may be incremented.

At this stage, media server 46 is instructed to stream the content with the designated MPEG ID, on the chosen RF channel at the desired distribution node 76 in step S836. As well, server 22 issues a command to controller 48 (by way of proxy 34) to tune the customer set-top box 80 to which the MPEG stream is destined to the appropriate MPEG channel in step S838.

Conveniently, in manners exemplary of embodiments of the present invention, set-top box 80 of media receiver 52 which receives content delivered on-demand, is tuned by controller 48 to an RF channel and MPEG stream not regularly accessible by that set-top box 80. That is, channels allocated for delivery of content on-demand to set-top boxes are chosen so as to not be tunables at the set-top box or by a remote control. Controller 48, however, may remotely tune these set-top boxes 80 to the content on-demand channel. In this way, although content on-demand for one media receiver 52 (and therefore one customer) is provided to an entire distribution node 76, only the set-top box 80 associated with the on-demand session and customer will be tuned remotely to the channel carrying the content on-demand to media receiver 52. Advantageously, no encryption is required, even though content may optionally be encrypted and decrypted at the set-top box 80.

Figure 5:
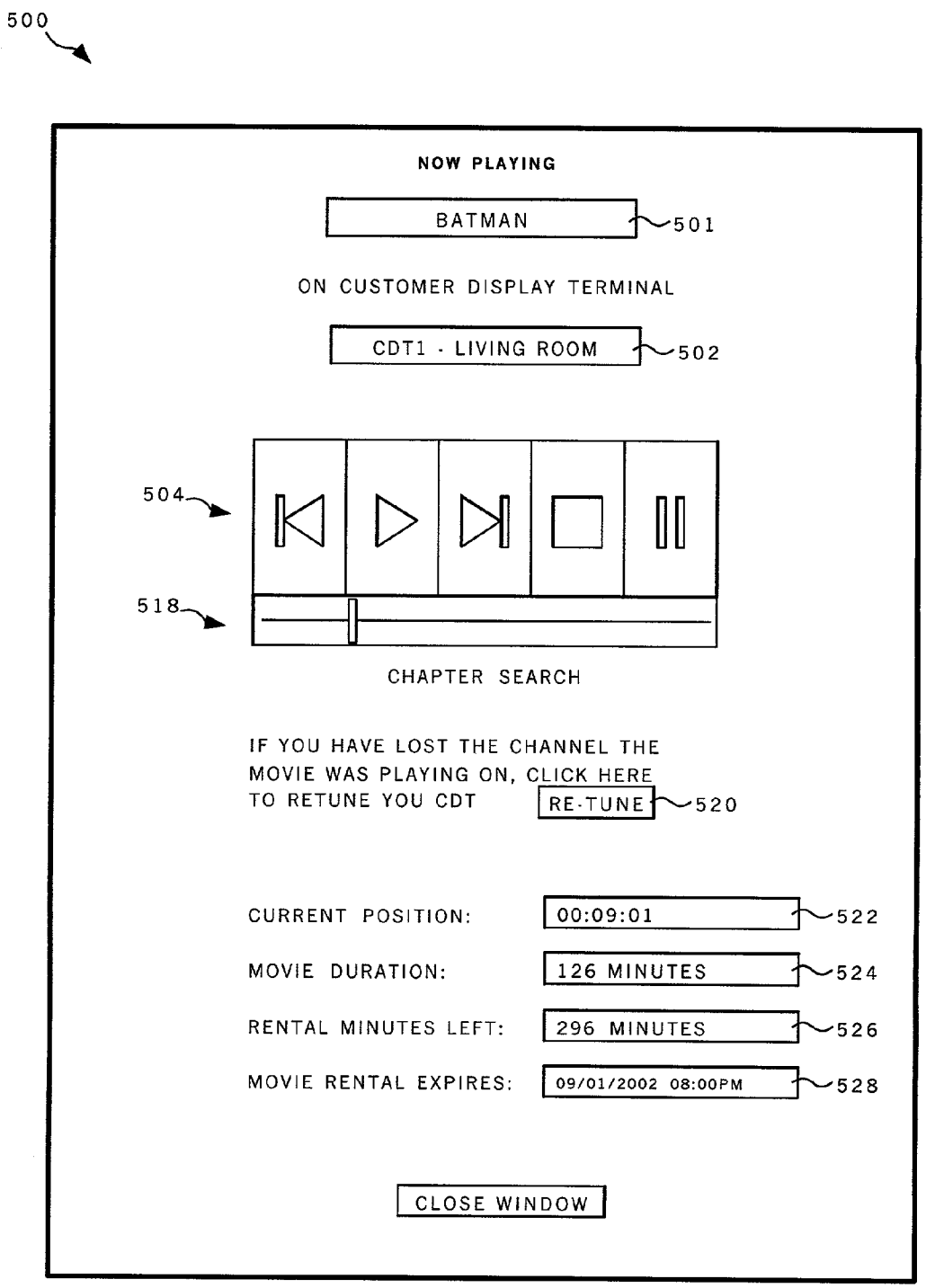

Once the customer media receiver 52 is tuned, server 22 may provide the user interface at device 12 with an additional window providing the in-progress status of content on-demand in step S840. Again, the window may be presented as a result of HTML, Java™ or similar data in memory 28 (FIG. 1). This window may be displayed by the web browser at device 12. Conveniently, the user interface may be updated periodically, or as certain events happen, so that it is updated in substantially real time. An example window 500 is illustrated in FIG. 5.

As illustrated, window 500 may include control bar 504 reminiscent of conventional playing controls, including rewind, play, fast-forward, stop, and pause buttons. A further chapter search bar 518 and current position display 522 may indicate the elapsed time in the delivered content and provide alternative position control. As well, the order title, duration, remaining playing time and session expiry time (as contained in fields 314*f*, 314*e*, 308*b* and 308*c*) may be displayed in fields 501, 524, 526, and 528, respectively.

Once window 500 is displayed, it may be updated in steps S844-S864. Specifically, any time a session record within database 62 is updated by an external event, as determined in step S844, window 500 may be updated to reflect the updated session in step S846 and S848. Window 500 may refresh periodically, and thereby update its contents.

As well, window 500 includes control buttons that transfer/submit data to server 22. That is, if any of the control buttons are pressed, corresponding data is sent to server 22 by the applet or application displaying the window 500. Thus, if data representative of a stop command is received at server 22, as determined in step S850, window 500 is updated to reflect stopped playing in step S852. As well, in step S856, and media server 46 is instructed to cease streaming of the particular MPEG stream. Further, the status field 308*e* of the session record is updated to reflect that playing has stopped, and the status of the MPEG channel in field 316*b* is set to free in step S858. As well, the available bandwidth maintained in field 312*b* is incremented to reflect the freed MPEG channel. Thereafter, the customer may again be presented with the initial selection window as steps S806 and onward are repeated.

Additionally, as set-top box 80 at media receiver 52 chosen by the customer may be independently tuned, by for example a remote control at the customer premises, it remains possible that the customer set-top box 80 may be inadvertently tuned away from the allocated RF/MPEG 2 channel in the midst of a on-demand session. In this case, the set-top box 80 cannot be tuned locally to receive the on-demand stream. Window 500 according contemplates re-tuning the set-top box by interaction with button 520. Pressing of this button 520, generates a data packet recognized at server 22 in step S852. Server 22, in turn re-issues the tune command to controller 48 based on the RF_CHANNEL and MPEG_CHANNEL_ID associated with the session being controlled by window 500 in step S855.

Similarly, in the event data representative of other user interaction is received at server 22, as determined in step S862, a suitable command is forwarded to media server 46 in step S864.

Figure 6:
Figure 7:
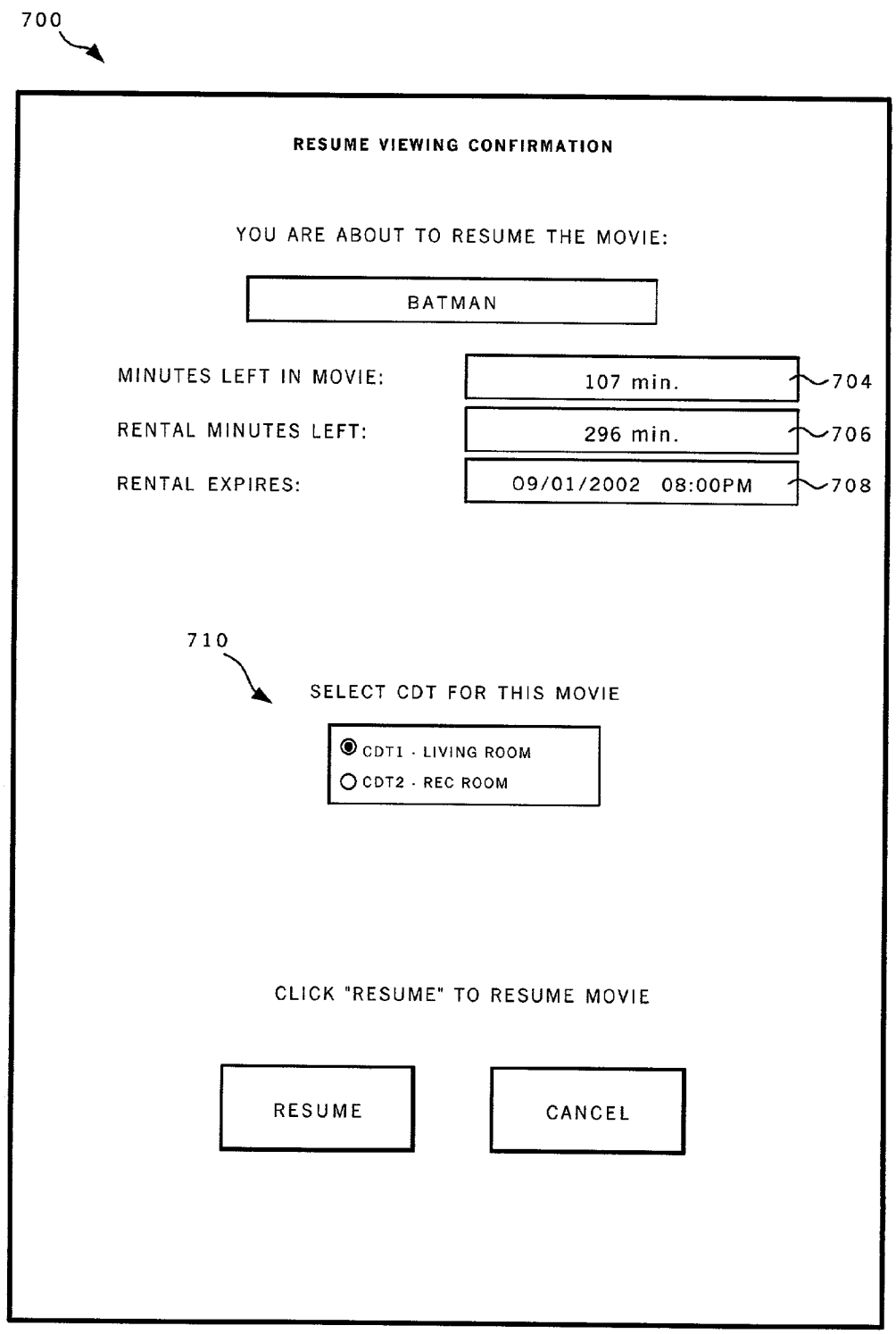

In the event that a customer shuts down network device 12, or decides to cease display of user interface 500, the customer may at any time resume contact with server 22 by way of network 20, using a device in communication with network 20. Beneficially, the status of in-progress sessions are maintained by proxy 34. If a session is already associated with a customer as that customer is authenticated in steps S804-808, information about existing sessions for that customer may be provided after log-on in step S812. Specifically, a session in progress window 600, illustrated in FIG. 6 may be presented to device 12 as part of the user interface, if sessions are in progress. As illustrated, summary information regarding order sessions may be presented, and play-back of stopped content streams may be resumed. In the event resumption of a particular content stream is chosen in step S812, confirmation window 700 illustrated in FIG. 7 may also be presented for that chosen session in step S812. As illustrated, window 700 is similar to window 400 (FIG. 4) and may be used to provide additional information to server 22, including a potentially newly selected display device for a suspended (i.e. "stopped") content. Advantageously, interaction with window 700 allows the customer to resume playing of content on another media receiver associated with the customer's account. Once the session is confirmed, steps S834 and onward are performed.

Once a session is established software at server 22 and the status of media server 46 are not synchronous. Database 62 is used to pass data about playing between server 22 and media server 46. Commands controlling media server 46 issued by server 22 in response to customer requests are issued to proxy 34. These commands may, for example, be text commands in data packets forwarded over the Ethernet connecting proxy 34 with server 22. Proxy 34, in turn converts the received commands into suitable instructions understood by controller 48 and media server 46. As required, proxy 34 may also query and update database 62, as detailed below. In this way, server 22 may co-operate with multiple controllers (like controller 48) and media servers (like media server 46) from different manufacturers. Only application software 42 at proxy 34 need be updated to communicate with different media servers, control channel servers, and the like.

Figure 9A:
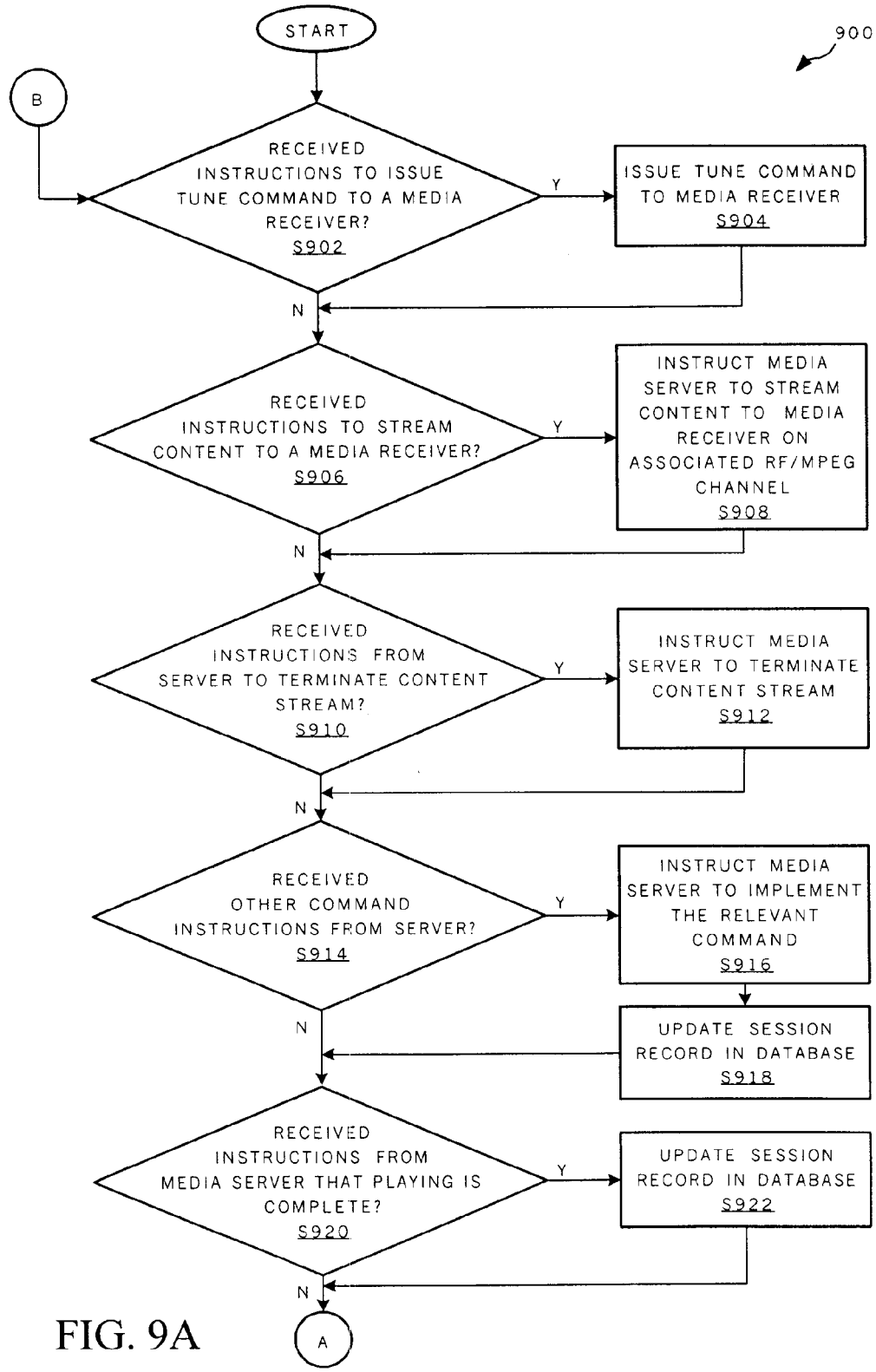
FIGS. 9A, 9B and 9C are flowcharts illustrating exemplary steps executed at a media server proxy of the system of FIG. 2.
Figure 9B:
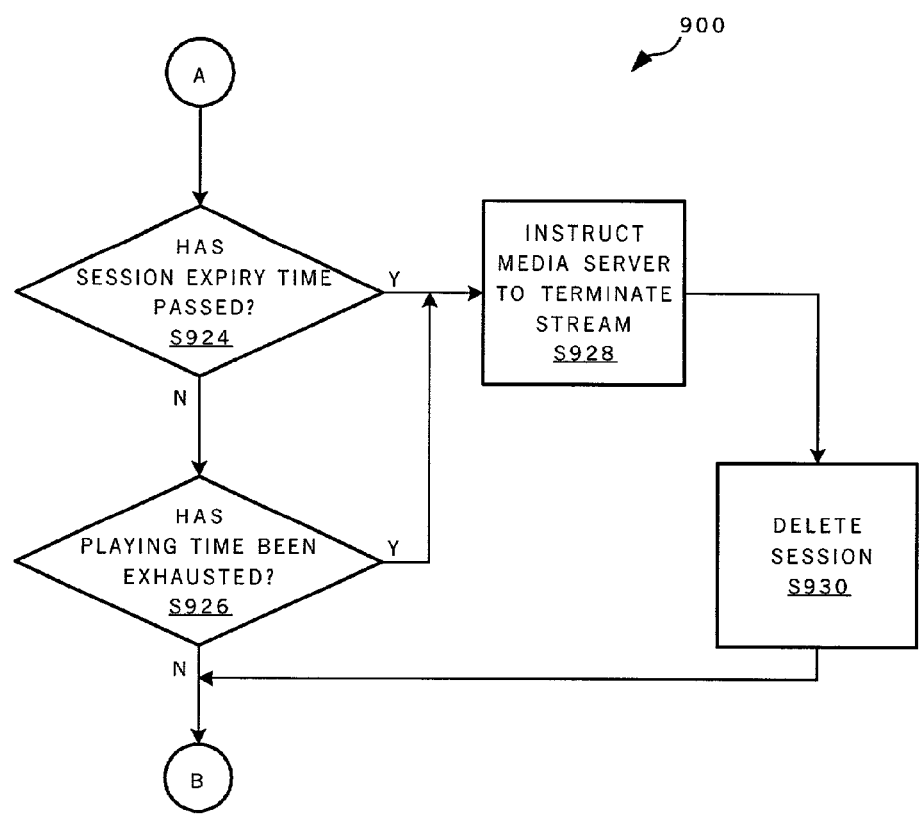

In any event, steps 900 performed at proxy 34 under control of application software 42 in response to commands received from proxy 34 and data received from proxy 34 are illustrated in FIGS. 9A and 9B. Steps 900 are preferably performed for each in-progress session for delivery of content on-demand. As illustrated, a received set-top box tune command is translated forwarded to controller 48 in steps S902 and S904 (FIG. 9A). A command to stream content is translated and forwarded to media server 46 in steps S906 and S908. A command to terminate provision of content on-demand to a media receiver 52 is translated in step S910 and provided to media server 46 in step S912. Other commands (slow-motion; fast forward, pause, rewind, etc.) may similarly be translated in step S914 and S916.

Proxy 34 similarly translates incoming status messages from media server 46 and controller 48, and updates database 62, as required. Thus, for example, a message from media server 46 indicating completion of playing results in receipt and translation of a message in step S920 and S922, with a corresponding update of status field 308*e* of session table 308. More specifically, the message from media server 46 will typically include an identifier of the MPEG 2 stream that has completed. Proxy 34 may query database 62 to find an associated session record, and update field 308*e* of that record. Similarly, as rewind, fast-forward and similar playing commands are issued to media server 46 one or more messages representative of the current playing position within an available stream may be provided to proxy 34, by media server 46. Again, the corresponding fields of the session record may be updated (e.g. step S918). Proxy 34 may periodically poll media server 46 to obtain status updates for each in-progress session. Database 62 is updated appropriately.

As well, once the maximum playing time has elapsed for a session, or once the expiry time passed, as determined in steps S924 and S926, proxy 34 may terminate the session by instructing media server 46 to cease streaming content in step S928, and by deleting the associated session record stored in table 308, setting the status field 316*b* of the associated MPEG channel record to 'free', and updating available bandwidth field 312*c* at the node in RF channel table 312 in step S930.

Figure 9C:
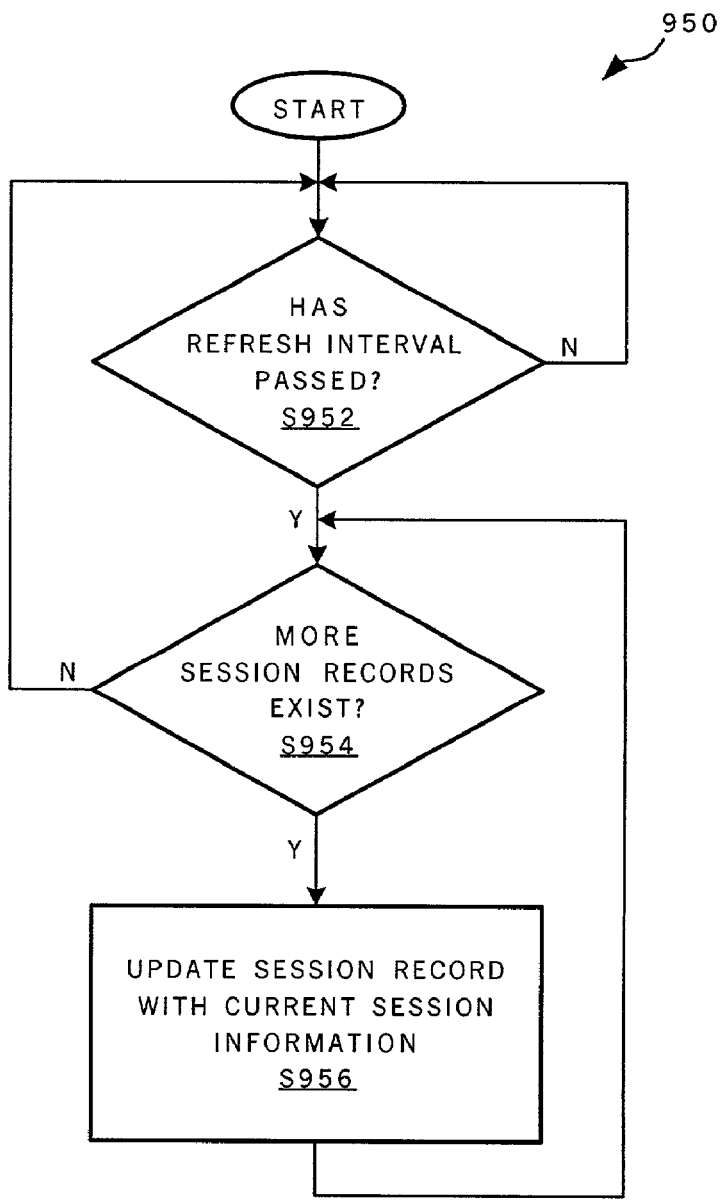

A further background process 950 executing at proxy 34 and illustrated in FIG. 9C may update the remaining playing minutes left. This may be accomplished by tracking time at proxy 34 and periodically adjusting the value of fields 308*b* (PLAYING_TIME_REMAINING) in database 62, for all in-progress sessions, as indicated by status field 308*e*. Specifically, at a fixed refresh interval (step S952) any sessions (step S954) currently having a status indicating "playing", or "paused" (vs. "stopped"), may have associated remaining time fields 308*b* updated (step S956) to reflect elapsed time. In this way, each session may be terminated in steps S924-S928, as described above.

Figure 10:
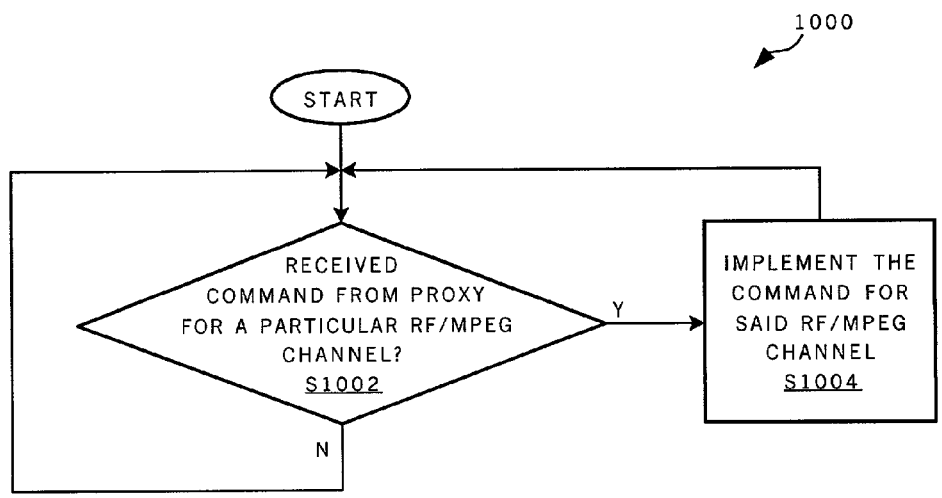
FIG. 10 is flowchart illustrating exemplary steps executed at a media server of the system of FIG. 2.

As illustrated in FIG. 10, commands received from proxy 34 are processed at media server 46, in step S1004. As will be appreciated, the format of the commands provided to media server 46 will depend on the exact type of media server 46 used. That is, each media server vendor typically chooses a protocol unique to that vendor for control of the server session creation, media playback and session tear-down. As such, proxy 34 translates media play requests (session setup, playback and session tear down) from serve 22 to the appropriate command protocol required by the media server 46.

As should now be appreciated, a suitable user interface is provided by server 22 to customer device 12, to control playing at customer media receiver 52. An association between device 12 and media receiver 52 for each customer is stored at server 22. This association may be varied as required. For example, a single customer account may be associated with multiple media receivers, thereby allowing a single device 12 act as an interface for multiple media receivers.

Advantageously, as content on-demand services evolve, new user interfaces may be stored at server 22 and provided to device 12 owned by customers. Upgrades to device 12 are the responsibility and expense of the customer. As device 12 has multiple purposes, upgrades will typically be motivated by customer interests not necessarily related to receipt of content on-demand services.

Further, as one device is used to select and order content-on demand, selections may be made at that device while content is being delivered to a suitably tuned receiver, or while other content is being presented. In this way browsing and ordering need not interfere with the enjoyment of other programming.

As noted, suitable interfaces may be provided to portable devices, such as personal digital assistants or cellular telephones, by way of a wireless data network, such as for example a G3 compliant network. As such, customers may use the portable devices in much the same way as convention infrared remote controls are used. Control commands issued by these devices, however, will travel back to system 10 by way of server 22 for ultimately control of provided content.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method for providing multimedia content to a customer comprising: connecting a computing device to a first server via a data communication network, the computing device including a display screen, communicating first data from the first server to the computing device via the data communication network, the first data implementing a first graphical user interface that provides for user selection of multimedia content; displaying the first graphical user interface on the display screen of the computing device; in response to user interaction with the first graphical user interface whereby the user selects particular multimedia content, communicating second data identifying the particular multimedia content from the computing device to the first server over the data communications network; connecting a second server to a media receiver at the customer's premises via a distribution network, the distribution network employing a plurality of RF channels for delivery of multimedia content from the second server to the media receiver, the media receiver separate and distinct from the computing device; communicating a command to the media receiver via the distribution network, the command providing third data that enables the media receiver to tune to at least one particular RF channel of said plurality of RF channels of the distribution network and receive the particular media content over said at least one particular RF channel, wherein the command is communicated to the media receiver upon a determination that sufficient bandwidth is available over said at least one particular RF channel; upon receipt of the command at the media receiver, tuning the media receiver to said at least one particular RF channel; and communicating the particular media content from the second server to the media receiver over said at least one particular RF channel of the distribution network where it is received at the media receiver for output therefrom.

2. A method according to claim 1, wherein:
the command is communicated from a controller to the media receiver over the distribution network, the controller operably coupled to the first server.

3. A method according to claim 1, wherein:
the command identifies a communication channel assigned for communication of the particular multimedia content to the media receiver, and
upon receipt of the command at the media receiver, the media receiver is controlled to receive the particular media content over the assigned communication channel.

4. A method according to claim 3, wherein:
the assigned communication channel comprises a particular RF frequency and a particular MPEG stream.

5. A method according to claim 1, wherein:
the first graphical user interface includes at least one web page that is displayed by a web browser execution on the computing device.

6. A method according to claim 1, wherein:
the data communication network comprises the Internet.

7. A method according to claim 1, further comprising:
maintaining a database storing status information associated with delivery of the particular media content from the second server to the first server over the distribution network, the database operably coupled to first server; and
communicating fourth data from the first server to the computing device via the data communication network, the fourth data defining a second graphical user interface that provides for user access to the status information.

8. A method according to claim 7, wherein the status information represents at least one of the following:
title of the particular media content,
a type associated with the particular media content,
a rating associated with the particular media content,
current position of playback of the particular media content at the media receiver,
remainder of a predetermined time period allocated for playback of the particular media content at the media receiver,
an expiration time and date upon which playback of the particular media content at the media receiver will be prevented,
status of playback of the particular media content at the media receiver, and
an order identifier associated with the particular media content.

9. A method according to claim 8, further comprising:
preventing playback of the particular media content at the media receiver upon expiration of the predetermined time period allocated for playback of the particular media content at the media receiver.

10. A method according to claim 8, further comprising:
preventing playback of the particular media content at the media receiver when the expiration time and date has passed.

11. A method according to claim 7, wherein:
the database stores information associated with the distribution network.

12. A method according to claim 11, wherein:

the information stored in the database includes a node table that includes a plurality of records corresponding to distribution nodes of the distribution network for delivering media content to customers, wherein each record of the node table includes an identifier that identifies a particular distribution node.

13. A method according to claim 12, wherein:

the information stored in the database includes an RF channel group table that includes a plurality of records corresponding to distribution nodes of the distribution network, wherein each record of the RF channel group table includes an identifier for a given RF channel group for delivering media content to customers via a particular distribution node.

14. A method according to claim 13, wherein:

the information stored in the database includes an RF channel table that includes a plurality of records each corresponding to a given RF channel group for a particular distribution node, wherein each record of the RF channel table includes an identifier for a particular RF channel, maximum capacity of the particular RF channel, available capacity of the particular RF channel, a channel type of the particular RF channel, and a frequency of the particular RF channel.

15. A method according to claim 14, wherein:

the information stored in the database includes an MPEG channel table that includes a plurality of records each corresponding to a given RF channel of an RF channel group for a particular distribution node, wherein each record of the MPEG channel table includes an identifier for a particular MPEG channel, a transmission bit rate for the particular MPEG channel, and a status of the particular MPEG channel.

16. A method according to claim 14, wherein:

the information stored in the database is accessed to identify a particular RF channel and MPEG channel with sufficient available bandwidth to communicate the particular media content over the distribution network from the distribution node to the media receiver.

17. A method according to claim 7, further comprising:

communicating fifth data from the first server to the computing device via the data communication network, the fifth data defining a third graphical user interface that provides for user control over re-communication of the command to the media receiver; and wherein, upon receipt of the re-communicated command at the media receiver, the media receiver is enabled to receive the particular media content communicated from the second server to the media receiver over the distribution network.

18. A method according to claim 1, wherein:

the first data communicated from the first server to the computing device defines a graphical user interface that provides for user selection of a particular media receiver from a plurality of media receivers located at the customer's premises, wherein the command is communicated to the particular media receiver over the distribution network, and wherein the particular media content is communicated to the particular media receiver over said at least one particular RF channel of the distribution network.

\* \* \* \* \*